United States Patent
Matsumoto et al.

(10) Patent No.: US 12,116,438 B2
(45) Date of Patent: Oct. 15, 2024

(54) THERMOPLASTIC RESIN COMPOSITION COMPRISING MALEIMIDE BASED COPOLYMER, POLYCARBONATE, AND AT LEAST ONE RESIN SELECTED FROM THE GROUP CONSISTING OF ABS RESIN, ASA RESIN, AES RESIN, AND SAN RESIN AND MOLDED ARTICLE THEREOF

(71) Applicant: DENKA COMPANY LIMITED, Tokyo (JP)

(72) Inventors: Masanori Matsumoto, Tokyo (JP); Kohei Nishino, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 115 days.

(21) Appl. No.: 17/603,257

(22) PCT Filed: Feb. 21, 2020

(86) PCT No.: PCT/JP2020/007197
§ 371 (c)(1),
(2) Date: Oct. 12, 2021

(87) PCT Pub. No.: WO2020/217687
PCT Pub. Date: Oct. 29, 2020

(65) Prior Publication Data
US 2022/0195094 A1 Jun. 23, 2022

(30) Foreign Application Priority Data
Apr. 26, 2019 (JP) ................... 2019-084931

(51) Int. Cl.
C08L 69/00 (2006.01)
C08F 222/08 (2006.01)
C08K 5/18 (2006.01)
C08L 25/12 (2006.01)
C08L 55/02 (2006.01)

(52) U.S. Cl.
CPC ............ *C08F 222/08* (2013.01); *C08K 5/18* (2013.01); *C08L 55/02* (2013.01); *C08L 69/00* (2013.01); *C08L 2201/08* (2013.01); *C08L 2205/035* (2013.01)

(58) Field of Classification Search
None
See application file for complete search history.

(56) References Cited

U.S. PATENT DOCUMENTS

| 4,204,047 A | 5/1980 | Margotte et al. |
| 4,792,585 A | 12/1988 | Yamamoto et al. |
| 2015/0368460 A1 | 12/2015 | Sohn et al. |
| 2017/0349740 A1 | 12/2017 | Nishino et al. |

FOREIGN PATENT DOCUMENTS

| CN | 107614598 A | | 1/2018 |
| CN | 108137915 A | | 6/2018 |
| DE | 27 12 171 A1 | | 9/1978 |
| EP | 3299415 | * | 3/2018 |
| JP | S62-007758 A | | 1/1987 |
| JP | 62207346 | * | 9/1987 |
| JP | S63-146960 A | | 6/1988 |
| JP | 07126509 | * | 5/1995 |
| JP | H07-126509 A | | 5/1995 |
| JP | H08-295796 A | | 11/1996 |
| JP | 09067512 | * | 3/1997 |
| JP | 09221522 | * | 8/1997 |
| JP | H09-221522 A | | 8/1997 |
| JP | H10-226748 A | | 8/1998 |
| JP | H11-199642 A | | 7/1999 |
| JP | 2001-214023 A | | 8/2001 |
| JP | 2002-020572 A | | 1/2002 |
| JP | 2013147559 | * | 8/2013 |
| JP | 2016-505088 A | | 2/2016 |
| WO | WO 2016/098885 A1 | | 6/2016 |

OTHER PUBLICATIONS

European Patent Office, Extended European Search Report in European Patent Application No. 20794398.6 (May 23, 2022).
Japanese Patent Office, International Search Report in International Patent Application No. PCT/JP2020/007197 (May 19, 2020).
The State Intellectual Property Office of People's Republic of China, The First Office Action in Chinese Patent Application No. 202080029252.0 (Jul. 27, 2022).

* cited by examiner

*Primary Examiner* — David J Buttner
(74) *Attorney, Agent, or Firm* — Leydig, Voit & Mayer, Ltd.

(57) ABSTRACT

A thermoplastic resin composition including polycarbonate and ABS resin having superior impact resistance, chemical resistance, flowability, and color phase, and a molded article thereof is provided. A thermoplastic resin composition includes maleimide based copolymer (A) including aromatic vinyl monomer unit, vinyl cyanide monomer unit, and maleimide monomer unit; polycarbonate (B); and at least one resin (C) selected from the group including ABS resin, ASA resin, AES resin, and SAN resin; wherein: the maleimide monomer unit is contained by 0.5 to 10 mass % and the polycarbonate (B) is contained by 20 to 70 mass % in 100 mass % of the thermoplastic resin composition.

6 Claims, No Drawings

THERMOPLASTIC RESIN COMPOSITION COMPRISING MALEIMIDE BASED COPOLYMER, POLYCARBONATE, AND AT LEAST ONE RESIN SELECTED FROM THE GROUP CONSISTING OF ABS RESIN, ASA RESIN, AES RESIN, AND SAN RESIN AND MOLDED ARTICLE THEREOF

CROSS-REFERENCE TO RELATED APPLICATIONS

This patent application is the U.S. national phase of International Application No. PCT/JP2020/007197, filed on Feb. 21, 2020, which claims the benefit of Japanese Patent Application No. 2019-084931, filed on Apr. 26, 2019, the disclosures of which are incorporated herein by reference in their entireties for all purposes.

TECHNICAL FIELD

The present invention relates to a thermoplastic resin composition and to a molded article thereof.

BACKGROUND

A resin composition comprising polycarbonate and ABS resin (hereinafter referred to as "PC/ABS based resin") has superior impact resistance, heat resistance, and molding processability. Therefore, PC/ABS based resin is used in a wide variety of applications including automotive parts, home appliances, and office equipment parts. As a measure for improving impact resistance of the PC/ABS based resin, a technique to formulate a copolymer including maleic anhydride is known (for example, Patent Literatures 1 and 2).

CITATION LIST

Patent Literature

[Patent Literature 1] JP 2002-020572A
[Patent Literature 2] WO 2016/098885A

SUMMARY OF INVENTION

Technical Problem

An object of the present invention is to provide a thermoplastic resin composition of PC/ABS based resin, which has not only improved impact resistance but also superior chemical resistance, flowability, and color phase, and to a molded article thereof.

Solution to Problem

That is, the gist of the present invention are as follows.
(1) A thermoplastic resin composition, comprising: maleimide based copolymer (A) including aromatic vinyl monomer unit, vinyl cyanide monomer unit, and maleimide monomer unit; polycarbonate (B); and at least one resin (C) selected from the group consisting of ABS resin, ASA resin, AES resin, and SAN resin; wherein: the maleimide monomer unit is contained by 0.5 to 10 mass % and the polycarbonate (B) is contained by 20 to 70 mass % in 100 mass % of the thermoplastic resin composition.
(2) The thermoplastic resin composition of (1), wherein: the maleimide based copolymer (A) comprises 40 to 60 mass % of the aromatic vinyl monomer unit, 5 to 20 mass % of the vinyl cyanide monomer unit, and 20 to 50 mass % of the maleimide monomer unit.
(3) The thermoplastic resin composition of (1) or (2), wherein: the thermoplastic resin composition contains 2 to 25 mass % of the maleimide based copolymer (A), 20 to 70 mass % of the polycarbonate (B), and 5 to 70 mass % of the at least one resin (C) selected from the group consisting of ABS resin, ASA resin, AES resin, and SAN resin.
(4) The thermoplastic resin composition of any one of (1) to (3), wherein: the maleimide based copolymer (A) further contains 0.1 to 15 mass % of unsaturated dicarboxylic anhydride monomer.
(5) The thermoplastic resin composition of any one of (1) to (4), wherein: the maleimide based copolymer (A) has a glass transition temperature of 165 to 200° C.
(6) The thermoplastic resin composition of any one of (1) to (5), wherein: the maleimide based copolymer (A) has a transmittance of 90% or higher, the transmittance measured with a 4 mass % tetrahydrofuran solution at a wavelength of 450 nm with an optical path length of 10 mm.
(7) A molded article molded from the thermoplastic resin composition of any one of (1) to (6).

Effect of the Invention

By the present invention, a PC/ABS based resin which is superior not only in the impact resistance but also chemical resistance, flowability, and color phase, and a molded article thereof are provided.

EMBODIMENTS OF THE INVENTION

Explanation of Terms

In the present specification, the phrase "A to B" means A or more and B or less.

Hereinafter, the embodiments of the present invention will be explained in detail.

The thermoplastic resin composition of the present invention comprises a maleimide based copolymer (A) including aromatic vinyl monomer unit, vinyl cyanide monomer unit, and maleimide monomer unit, polycarbonate (B), and at least one resin (C) selected from the group consisting of ABS resin, ASA resin, AES resin, and SAN resin.

<Maleimide Based Copolymer (A)>

Maleimide based copolymer (A) is a copolymer obtained by copolymerizing aromatic vinyl monomer unit, vinyl cyanide monomer unit, and maleimide monomer unit.

As the aromatic vinyl monomer used for the maleimide based copolymer (A), for example, styrene, o-methylstyrene, m-methylstyrene, p-methylstyrene, 2,4-dimethylstyrene, ethylstyrene, p-tert-butylstyrene, α-methylstyrene, α-methyl-p-methylstyrene, and the like can be mentioned. Among these, styrene is preferable. The aromatic vinyl monomer can be used alone, or two or more of these can be used in combination.

As the vinyl cyanide monomer unit used for the maleimide based copolymer (A), for example, acrylonitrile, methacrylonitrile, ethacrylonitrile, fumaronitrile, and the like can be mentioned. Among these, acrylonitrile is preferable. The vinyl cyanide monomer can be used alone, or two or more of these can be used in combination.

As the maleimide monomer unit used for the maleimide based copolymer (A), for example, N-alkyl maleimides such as N-methylmaleimide, N-butylmaleimide, and N-cyclohexylmaleimide, and N-phenylmaleimide, N-chlorophenylmaleimide, N-methylphenylmaleimide, N-methoxyphenylmaleimide, N-tribromo-phenylmaleimide and the like can be mentioned. Among these, N-phenylmaleimide is preferable. The maleimide monomer can be used alone, or two or more of these can be used in combination.

The amount of the aromatic vinyl monomer unit contained in the maleimide based copolymer (A) is 40 to 60 mass %, preferably 45 to 55 mass %. When the amount of the aromatic vinyl monomer unit is less than 40 mass %, the color phase of the thermoplastic resin composition becomes yellowish, and when the amount of the aromatic vinyl monomer unit exceeds 60 mass %, the heat resistance of the thermoplastic resin composition degrades.

The amount of the vinyl cyanide monomer unit contained in the maleimide based copolymer (A) is 5 to 20 mass %, preferably 7 to 15 mass %. When the amount of the vinyl cyanide monomer unit is less than 5 mass %, the effect of improving the chemical resistance of the thermoplastic resin composition cannot be achieved, and when the amount of the vinyl cyanide monomer unit exceeds 20 mass %, the color phase of the thermoplastic resin composition becomes yellowish.

The amount of the maleimide monomer unit contained in the maleimide based copolymer (A) is 20 to 50 mass %, preferably 25 to 45 mass %. When the amount of the maleimide monomer unit is less than mass %, the effect of improving the heat resistance of the thermoplastic resin composition cannot be achieved, and when the amount of the maleimide monomer unit exceeds 50 mass %, the impact strength of the thermoplastic resin composition degrades.

The maleimide based copolymer (A) can have a copolymerizable monomer other than the aromatic vinyl monomer, vinyl cyanide monomer, and maleimide monomer copolymerized within an extent which does not impair the effect of the present invention. As the copolymerizable monomer of the maleimide based copolymer (A), unsaturated dicarboxylic anhydride monomer such as maleic anhydride, itaconic anhydride, citraconic anhydride, and aconitic anhydride; acrylic acid ester monomer such as methyl acrylate, ethyl acrylate and butyl acrylate; methacrylic acid ester monomer such as methyl methacrylate and ethyl methacrylate; vinyl carboxylic acid monomer such as acrylic acid and methacrylic acid; acrylamide and methacrylamide can be mentioned for example. These copolymerizable monomer of the maleimide based copolymer (A) can be used alone, or two or more of these can be used in combination.

As the copolymerizable monomer of the maleimide based copolymer (A), unsaturated dicarboxylic anhydride monomer is preferable.

The amount of the unsaturated dicarboxylic anhydride monomer unit contained in the maleimide based copolymer (A) is preferably 0.1 to 15 mass %, more preferably 0.5 to 10 mass %. When the amount of the unsaturated dicarboxylic acid unit is less than 0.1 mass %, the effect as a compatibilizer by reacting with other resin having terminal amino group or alcohol group cannot be achieved, and when the amount of the unsaturated dicarboxylic acid unit exceeds 15 mass %, thermal stability of the thermoplastic resin composition degrades.

The content rate of each of the monomer units contained in the maleimide based copolymer (A) is a value obtained by the following measurement conditions using C-13 NMR method.

Name of Instrument: FT-NMR AVANCE 300 (available from Bruker Corporation)
Solvent: deuterated chloroform
Concentration: 14 mass %
Temperature: 25° C.
Cumulative Number: 10000 times The maleimide based copolymer (A), in terms of effectively improving heat resistance of a resin to be kneaded and mixed with, preferably has a glass transition temperature or 165 to 200° C., more preferably 170 to 200° C. The glass transition temperature is an extrapolated glass transition initiating temperature (Tig) of the maleimide based copolymer measured in accordance with JIS K-7121 by the following instrument and measurement conditions.

Name of Instrument: Differential Scanning calorimeter, Robot DSC 6200 (available from Seiko Instruments Inc.)
Temperature Elevation Rate: 10° C./min The transmittance of the maleimide based copolymer (A) as a 4 mass % tetrahydrofuran solution at a wavelength of 450 nm with an optical path length of 10 mm is preferably 90% or higher. When the transmittance is lower than 90%, the color phase of the thermoplastic resin composition obtained by kneading and mixing can be inferior. The transmittance is preferably 92% or higher. The transmittance is obtained by preparing a tetrahydrofuran solution of maleimide based copolymer adjusted to 4 mass %, followed by filling the solution into a quartz square cell with an optical path length of 10 mm for measurement, and then measuring using a spectrophotometer V-670ST (available from JASCO Corporation).

The polymerization method of the maleimide based copolymer (A) includes, for example, solution polymerization and bulk polymerization. Solution polymerization is preferable from the viewpoint that a maleimide based copolymer (A) with a uniform copolymerization composition can be obtained by polymerizing while adding the monomer to be copolymerized divisionally or continuously. The solvent for solution polymerization is preferably non-polymerizable from the viewpoint that formation of byproduct and adverse effect can be suppressed. For example, ketone such as acetone, methyl ethyl ketone, methyl isobutyl ketone, acetophenone and the like; ether such as tetrahydrofuran, 1,4-dioxane and the like; aromatic hydrocarbon such as benzene, toluene, xylene, chlorobenzene and the like; N,N-dimethylformamide; dimethyl sulfoxide; N-methyl-2-pyrrolidone and the like can be mentioned. In terms of easily removing solvent during devolatilization and recovery of the maleimide based copolymer, methyl ethyl ketone and methyl isobutyl ketone are preferable. Polymerization process of any one of continuous polymerization process, batch process (batch), and semi-batch process can be applied.

The polymerization method of the maleimide based copolymer (A) is not particularly limited. Here, the maleimide based copolymer (A) can be obtained preferably by radical polymerization, and the polymerization temperature is preferably in the range of 80 to 150° C. Polymerization initiator is not particularly limited. For example, known azo compound such as azobisisobutyronitrile, azobiscyclohexanecarbonitrile, azobismethylpropionitrile, azobismethylbutyronitrile and the like; and known organic peroxide such as benzoyl peroxide, t-butyl peroxybenzoate, 1,1-bis(t-butyl peroxy)-3,3,5-trimethylcyclohexane, t-butyl peroxy isopropyl monocarbonate, t-butyl peroxy-2-ethylhexanoate, di-t-butyl peroxide, dicumylperoxide, ethyl-3,3-di-(t-butylperoxy)butyrate and the like can be used. These polymerization initiators can be used alone, or two or more of these can be used in combination. From the viewpoint of the polymerization reaction rate and control of the polymerization ratio, azo compounds and organic peroxides having a 10 hour half-life of 70 to 120° C. are preferable. The amount of the polymerization initiator is not particularly limited. Here, the amount is preferably 0.1 to 1.5 parts by mass with respect to 100 parts by mass of the total monomer being used in the polymerization, more preferably 0.1 to 1.0 parts by mass. When the amount of the polymerization initiator used is 0.1 parts by mass or more, it is preferable since sufficient polymerization reaction rate can be achieved. When the amount of the polymerization initiator used is less than 1.5 parts by mass, the polymerization reaction rate can be suppressed, thereby allowing easy control of the reaction, resulting in obtaining the target molecular weight easily.

In the manufacture of the maleimide based copolymer (A), chain transfer agent can be used. The chain transfer agent used is not particularly limited. For example, n-octyl mercaptan, n-dodecyl mercaptan, t-dodecyl mercaptan, α-methyl styrene dimer, ethyl thioglycolate, limonene, terpinolene and the like can be mentioned. The amount of the chain transfer agent used is not particularly limited, so long as it is in the range which allows to obtain the target molecular weight. Here, the amount of the chain transfer agent used is preferably 0.01 to 0.8 parts by mass with respect to 100 parts by mass of the total monomer being used in the polymerization, more preferably 0.1 to 0.5 parts by mass. When the amount of the chain transfer agent used is 0.01 to 0.8 parts by mass, the target molecular weight can be obtained easily.

The maleimide based copolymer (A) can be manufactured by first copolymerizing aromatic vinyl monomer, vinyl cyanide monomer, and unsaturated dicarboxylic anhydride, and then imidizing the unsaturated dicarboxylic anhydride monomer unit in the copolymer by ammonia or primary amine, thereby converting the unsaturated dicarboxylic anhydride monomer unit into the maleimide monomer unit (post imidizing method). When the maleimide based copolymer is obtained by the post imidizing method, it is preferable since the amount of the residual maleimide monomer in the copolymer can be suppressed.

As the primary amine, for example, alkyl amine such as methylamine, ethylamine, n-propylamine, iso-propylamine, n-butylamine, n-pentylamine, n-hexylamine, n-octylamine, cyclohexylamine, decylamine, and chloro- or bromo-substituted alkyl amine; and aromatic amine such as aniline, toluidine, naphthylamine and the like can be mentioned. Among these, aniline and cyclohexylamine are preferable. These primary amines can be used alone, or two or more of these can be used in combination. The amount of the primary amine added is not particularly limited. Here, the amount of the primary amine added is preferably 0.7 to 1.1 molar equivalent with respect to the unsaturated dicarboxylic anhydride monomer unit, more preferably 0.85 to 1.05 molar equivalent. When the amount of the primary amine added is 0.7 molar equivalent or more with respect to the unsaturated dicarboxylic anhydride monomer contained in the maleimide based copolymer (A), it is preferable since the thermal stability of the thermoplastic resin composition obtained would be superior. When the amount of the primary amine added is 1.1 molar equivalent or less, it is preferable since the amount of the residual primary amine in the maleimide based copolymer would be suppressed.

When the maleimide based copolymer (A) is obtained by post imidizing method, in the reaction of ammonia or primary amine with the unsaturated dicarboxylic anhydride monomer unit, especially in the reaction to convert the unsaturated dicarboxylic anhydride monomer unit into the maleimide monomer unit, catalyst can be used as necessary in order to promote the dehydration/ring-closing reaction. There is no particular limitation regarding the kind of the catalyst. Here, for example, tertiary amine can be used. As the tertiary amine, for example, trimethylamine, triethylamine, tripropylamine, tributylamine, N,N-dimethylaniline, N,N-diethylaniline and the like can be mentioned. The addition amount of the tertiary amine is not particularly limited. Here, the addition amount is preferably 0.01 molar equivalent or more with respect to the unsaturated dicarboxylic anhydride monomer unit. The temperature for the imidizing reaction of the present invention is preferably 100 to 250° C., more preferably 120 to 200° C. When the temperature for the imidizing reaction is 100° C. or higher, the reaction rate is sufficiently fast. Therefore, it is preferable in view of productivity. When the temperature for the imidizing reaction is lower than 250° C., it is preferable since the degradation of the physical property due to thermal degradation of the maleimide based copolymer (A) can be suppressed.

When the maleimide based copolymer is obtained by post imidizing method, polymerization can be carried out by charging the entire amount of the aromatic vinyl monomer, vinyl cyanide monomer, and the unsaturated dicarboxylic anhydride monomer at the initial stage of polymerization. However, since the aromatic vinyl monomer and the unsaturated dicarboxylic anhydride monomer have strong tendency for alternate copolymerization, the aromatic vinyl monomer and the unsaturated dicarboxylic anhydride monomer would be consumed at the initial stage of polymerization, and then copolymer containing large amount of vinyl cyanide monomer unit would be generated in the latter stage of polymerization. As a result, the color phase of the maleimide based copolymer obtained would deteriorate. Further, the composition distribution of the maleimide based copolymer obtained would be large, thereby losing compatibility with the PC/ABS based resin and the like when kneaded and mixed. This would result in undesirable physical property of the thermoplastic resin composition. Therefore, in order to obtain a maleimide based copolymer (A) having superior color phase and small (uniform) composition distribution, it is preferable to adopt a manufacturing method including the following steps.

Initial Polymerization Step: Entire amount of the vinyl cyanide monomer to be charged, 10 to 90 mass % of the aromatic vinyl monomer to be charged, and 0 to 30 mass % of the unsaturated dicarboxylic anhydride monomer to be charged are mixed, and then copolymerization is initiated by charging the mixture at the initial stage of polymerization.

Medium Polymerization Step: The residual amount of the aromatic vinyl monomer to be charged and the residual amount of the unsaturated dicarboxylic anhydride monomer to be charged are each added by portions or continuously while continuing copolymerization.

Final Polymerization Step: Aromatic vinyl monomer is added by the amount of 1/10 or more of the amount to be added by portions or continuously, after charging the entire amount of the unsaturated dicarboxylic anhydride monomer.

Imidizing Step: The aromatic vinyl—vinyl cyanide—unsaturated dicarboxylic anhydride copolymer thus obtained is imidized with ammonia or with primary amine to obtain the maleimide based copolymer (A).

As the method for removing volatile component (devolatilization method) such as solvent used in the solution polymerization or unreacted monomer from the solution after solvent reaction or from the solution after the post imidizing of the maleimide based copolymer (A), known method can be applied. For example, a vacuum devolatilization tank equipped with a heater and a devolatilization extruder equipped with a vent can be used. The molten maleimide based copolymer after the devolatilization is transferred to the pelletizing step. The molten copolymer is extruded into strands from a porous die, and processed into pellets by cold cut method, air-cooled hot cutting method or underwater hot cutting method.

The maleimide based copolymer (A) is melt blended with polycarbonate (B) and resin (C) described later, so that the content of the maleimide monomer unit in 100 mass % of the thermoplastic resin composition is 0.5 to 10 mass %, preferably 1.0 to 5.0 mass %. When the content of the maleimide monomer unit is less than 0.5 mass %, the effect of improving the heat resistance of the thermoplastic resin composition cannot be achieved, and when the content of the maleimide monomer unit exceeds 10 mass %, the impact strength of the thermoplastic resin composition degrades. In order to adjust the content of the maleimide monomer unit in the thermoplastic resin composition, the content of the maleimide monomer unit in the maleimide based copolymer (A) can be adjusted, or the amount of the maleimide based copolymer (A) added to obtain the thermoplastic resin composition can be adjusted. Although not particularly limited, the maleimide based copolymer (A) is contained in 100 mass % of the thermoplastic resin composition preferably by 2 to 25 mass %, further preferably by 5 to 20 mass %. When the content is in such range, it is preferable since working efficiency during melt blending can be improved.

<Polycarbonate (B)>

Polycarbonate (B) is a polymer having a polymer having a carbonic acid ester bond represented by the general formula of —[—O—R—O—C(=O)—]—. Here, R is generally hydrocarbon. Polycarbonate (B) can be categorized as aromatic polycarbonate, aliphatic polycarbonate, alicyclic polycarbonate, depending on the divalent hydroxy compound as the raw material. Further, it can be a homopolymer consisting of one kind of repeating unit, or can be a copolymer comprising two or more kinds of repeating units. Polycarbonate using bisphenol A as the divalent hydroxy compound as the raw material is widely manufactured industrially, and can be suitably used.

As the manufacturing method of polycarbonate (B), known method can be adopted. For example, transesterification method (also referred to as melting method, melt polymerization method) in which bisphenol A and diphenyl carbonate are molt at high temperature and then transesterification reaction is allowed to proceed while removing the generated phenol under reduced pressure; phosgene method (also referred to as interfacial polymerization) in which bisphenol A in aqueous solution or aqueous suspension of sodium hydroxide is subjected to phosgene in the presence of methylene chloride, and pyridine method in which bisphenol A is subjected to phosgene in the presence of pyridine and methylene chloride, can be mentioned.

The weight average molecular weight of polycarbonate (B) is preferably 10,000 to 200,000, more preferably 10,000 to 100,000. The weight average molecular weight of polycarbonate (B) is a value of polystyrene equivalent measured by gel permeation chromatography (GPC).

The polycarbonate (B) is contained in 100 mass % of the thermoplastic resin composition preferably by 20 to 70 mass %, more preferably 35 to 65 mass %. When the content of the polycarbonate (B) is less than 20 mass %, the impact strength of the thermoplastic resin composition degrades, and when the content exceeds 70 mass %, the flowability of the thermoplastic resin composition degrades.

<Resin (C)>

Resin (C) is at least one resin selected from the group consisting of ABS resin, ASA resin, AES resin, and SAN resin.

The ABS resin, ASA resin, and AES resin are graft copolymers obtained by graft copolymerizing at least a styrene based monomer and an acrylonitrile based monomer to a rubbery polymer. For example, when a butadiene based rubber such as polybutadiene or styrene-butadiene copolymer is used as the rubbery polymer, the resin (C) is ABS resin. When an acryl based rubber comprising butyl acrylate, ethyl acrylate and the like is used, the resin (C) is ASA resin. When an ethylene based rubber such as ethylene-α-olefin copolymer is used, the resin (C) is AES resin. At the time of graft copolymerization, two or more of these rubbery polymers can be used in combination.

As the manufacturing method of the ABS resin, known method can be adopted. For example, manufacturing method by continuous bulk polymerization, and a method using two kinds of resins can be mentioned, the two kinds of resins being a graft copolymer obtained by emulsion polymerization and pellet SAN resin obtained by continuous bulk polymerization.

The manufacturing method of the graft copolymer by emulsion polymerization includes a method in which styrene based monomer and acrylonitrile based monomer are emulsion graft polymerized to a latex of rubbery polymer (hereinafter referred to as "emulsion graft polymerization method"). By the emulsion graft polymerization method, a latex of graft copolymer can be obtained.

In the emulsion graft polymerization method, water, emulsifier, polymerization initiator, and chain transfer agent are used, and the polymerization temperature is preferably in the range of 30 to 90° C. Examples of the emulsifier include anionic surfactant, cationic surfactant, amphoteric surfactant, nonionic surfactant, and the like. Examples of the polymerization initiator include organic peroxides such as cumene hydroperoxide, diisopropylbenzene peroxide, t-butyl peroxyacetate, t-hexyl peroxybenzoate, t-butyl peroxybenzoate and the like; persulfates such as potassium persulfate, ammonium persulfate and the like; azo-based compounds such as azobisbutyronitrile and the like; reducing agents such as iron ion and the like; secondary reducing agents such as sodium formaldehyde sulfoxylate and the like; and chelating agents such as ethylenediaminetetraacetic acid disodium and the like. Examples of the chain transfer agent include n-octyl mercaptan, n-dodecyl mercaptan, t-dodecyl mercaptan, α-methyl styrene dimer, ethyl thioglycolate, limonene, terpinolene and the like.

The latex of the graft copolymer can be solidified by a known method to recover the graft copolymer. For example, a coagulant is added to the latex of the graft copolymer to solidify the latex, and the graft copolymer is washed and dehydrated in a dehydrator, and subjected to a drying step, thereby obtaining a powdery graft copolymer.

In the powdery graft copolymer obtained by the emulsion graft polymerization method, content of the residual monomer is preferably less than 15,000 μg/g, and more preferably less than 8,000 μg/g. The content of the residual monomer can be adjusted by the polymerization conditions, and the value is obtained by quantitative analysis using gas chromatography.

From the viewpoint of impact resistance, the content of the rubbery polymer in the graft copolymer obtained by the emulsion graft polymerization method is preferably 40 to 70 mass %, and more preferably 45 to 65 mass %. The content of the rubbery polymer can be adjusted by, for example, the ratio of the styrene based monomer and the acrylonitrile based monomer used with respect to the rubbery polymer at the time of the emulsion graft polymerization.

From the viewpoint of impact resistance of the thermoplastic resin composition, the constitutional units excluding the rubbery polymer of the graft copolymer obtained by the emulsion graft polymerization method are preferably 70 to 85 mass % of styrene based monomer unit, and 15 to 30 mass % of acrylonitrile based monomer unit.

The gel component of the graft copolymer is preferably in the form of particles. The gel component is a rubbery polymer particle obtained by graft copolymerizing styrene based monomer and acrylonitrile based monomer, which is insoluble in an organic solvent such as methyl ethyl ketone or toluene, and separated by centrifugal separation. In some cases, an occlusion structure in which a styrene-acrylonitrile copolymer is encapsulated in the form of particles inside the rubbery polymer particles. When the graft copolymer and the styrene-acrylonitrile based copolymer are melt blended, the gel component exists as a dispersed phase in the form of particles in the continuous phase of the styrene-acrylonitrile based copolymer. The gel component is a value calculated as follows. The graft copolymer of mass W is dissolved in methyl ethylene ketone, and then the solution is centrifuged at 20000 rpm using a centrifuge to precipitate the insoluble matter. Subsequently, the supernatant liquid is removed by decantation to obtain the insoluble matter. From the mass S of dried insoluble matter after vacuum drying, the gel component is calculated from the following equation of gel component (mass %)=(S/W)×100. Similarly, the resin composition obtained by melt blending the graft copolymer and the styrene-acrylonitrile based copolymer can be dissolved in methyl ethyl ketone and centrifuged, thereby allowing calculation of the gel component.

From the viewpoint of the impact resistance and the appearance of the molded article, the volume average particle diameter of the gel component of the graft copolymer is preferably in the range of 0.10 to 1.0 µm, more preferably 0.15 to 0.50 µm. The volume average particle diameter is a value calculated as follows. Ultra thin sections are cut out from the pellets of a resin composition obtained by melt blending the graft copolymer and the styrene-acrylonitrile based copolymer, followed by observation with a transmission electron microscope (TEM), and then calculation is done from the image analysis results of particles dispersed in the continuous phase. The volume average particle diameter can be adjusted by, for example, the particle diameter of the latex of the rubbery polymer used in the emulsion graft polymerization. The particle diameter of the latex of the rubbery polymer can be adjusted by the addition method of the emulsifier and the amount of water used during the emulsion polymerization. Since long polymerization time is required in order to obtain a preferable range, the productivity is low. Therefore, there is a method in which rubbery polymers having a particle diameter of about 0.1 µm is polymerized in a short time and then the rubber particles are enlarged by chemical aggregation method or physical aggregation method.

The graft ratio of the graft copolymer is preferably 10 to 100 mass %, more preferably 20 to 70 mass % from the viewpoint of impact resistance. The graft ratio is a value calculated from the equation of: graft ratio (mass %)=[(G−RC)/RC]×100, based on the gel component (G) and the content of the rubbery polymer (RC). The graft ratio represents the amount of the styrene-acrylonitrile based copolymer contained in per unit mass of the rubbery polymer. The styrene-acrylonitrile based copolymer can be bonded to particles of the rubbery polymer by graft or can be encapsulated in the particle. The graft ratio can be adjusted by, for example, ratio of the monomer and the rubbery polymer, kind and amount of the initiator, amount of the chain transfer agent, amount of emulsifier, polymerization temperature, feeding method (lump/multistage/continuous), addition rate of the monomer and the like during the emulsion graft polymerization.

The degree of toluene swelling of the graft copolymer is preferably 5 to 20 times from the viewpoint of impact resistance and appearance of the molded article. The degree of toluene swelling represents the degree of crosslinking of the particles of the rubbery polymer, and is calculated as follows. The graft copolymer is dissolved in toluene, and then the insoluble matter is separated by centrifugation or filtration. The value of the degree of toluene swelling is calculated from the mass ratio of the mass in a state of being swollen with toluene and the mass in a dry state where toluene is removed by vacuum drying. The degree of toluene swelling is, for example, influenced by the degree of crosslinking of the rubbery polymer used in the emulsion graft polymerization, and can be adjusted by initiator, emulsifier, polymerization temperature, addition of polyfunctional monomer such as divinylbenzene, and the like during the emulsion polymerization of the rubbery polymer.

The SAN resin is a copolymer having a styrene based monomer unit and an acrylonitrile based monomer unit, such as a styrene-acrylonitrile based copolymer.

As the other copolymerizable monomer of the SAN resin, (meth) acrylic acid ester based monomer such as methyl methacrylate and the like; acrylic ester based monomer such as butyl acrylate, ethyl acrylate and the like; (meth) acrylic acid-based monomer such as methacrylic acid and the like; acrylic acid based monomer such as acrylic acid and the like; N-substituted maleimide monomer such as N-phenyl maleimide and the like can be used.

The constituent unit of the SAN resin is, in terms of compatibility with polycarbonate, preferably 60 to 90 mass % of styrene based monomer unit and 10 to 40 mass % of vinyl cyanide monomer unit, more preferably 70 to 85 mass % of styrene based monomer unit and 15 to 30 mass % of vinyl cyanide monomer unit. The amount of the styrene based monomer unit and vinyl cyanide monomer unit are values measured by 13C-NMR.

As a production method of the SAN resin, known method can be adopted. For example, SAN resin can be produced by bulk polymerization, solution polymerization, suspension polymerization, emulsion polymerization and the like. As an operation method of the reaction apparatus, any of the continuous process, batch process (batch), semi-batch process can be applied. From the viewpoint of quality and productivity, bulk polymerization and solution polymerization are preferable, and continuous process is preferable. Examples of the solvents for bulk polymerization or solution polymerization include alkylbenzene such as benzene, toluene, ethylbenzene, xylene and the like; ketone such as acetone, methyl ethyl ketone and the like; aliphatic hydrocarbon such as hexane, cyclohexane and the like.

In the bulk polymerization or solution polymerization of SAN resin, polymerization initiator and chain transfer agent can be used, and the polymerization temperature is preferably in the range of 120 to 170° C. Examples of the polymerization initiator include peroxy ketal such as 1,1-di (t-butylperoxy) cyclohexane, 2,2-di (t-butylperoxy) butane, 2,2-di (4,4-di-t-butylperoxycyclohexyl) propane, 1,1-di (t-amylperoxy) cyclohexane and the like; hydroperoxide such as cumene hydroperoxide, t-butyl hydroperoxide and the like; alkyl peroxide such as t-butyl peroxyacetate, t-amyl peroxy isononanoate and the like; dialkyl peroxide such as t-butyl cumyl peroxide, di-t-butyl peroxide, dicumyl peroxide, di-t-hexyl peroxide and the like; peroxyester such as t-butyl peroxyacetate, t-butyl peroxybenzoate, t-butylperoxy isopropyl monocarbonate and the like; peroxy carbonate such as t-butyl peroxy isopropyl carbonate, polyether tetrakis (t-butyl peroxy carbonate) and the like; N,N'-azobis (cyclohexane-1-carbonitrile), N,N'-azobis (2-methylbutyronitrile), N,N'-azobis (2,4-dimethylvaleronitrile), N,N'-azobis [2-(hydroxymethyl) propionitrile] and the like. These polymerization initiators can be used alone or two or more of these can be used in combination. Examples of the chain transfer agent include n-octyl mercaptan, n-dodecyl mercaptan, t-dodecyl mercaptan, α-methyl styrene dimer, ethyl thioglycolate, limonene, terpinolene and the like.

As the method for removing volatile component such as unreacted monomer and solvent used in the solution polymerization after polymerization of the SAN resin, known method can be applied. For example, a vacuum devolatilization tank equipped with a preheater and a devolatilization extruder equipped with a vent can be used. The molten SAN resin after the devolatilization is transferred to the pelletizing step. The molten resin is extruded into strands from a porous die, and processed into pellets by cold cut method, air-cooled hot cutting method or underwater hot cutting method.

In the SAN resin, total content of the residual monomer and solvent is preferably less than 2000 µg/g, and more preferably less than 1500 µg/g. The content of the residual monomer and solvent can be adjusted by the devolatilization conditions, and the value is obtained by quantitative analysis using gas chromatography.

The weight average molecular weight of SAN resin is preferably 50,000 to 250,000, more preferably 70,000 to 200,000 from the viewpoint of impact resistance and moldability of the resin composition. The weight average molecular weight of SAN resin is a polystyrene equivalent value measured in a THF solvent using gel permeation chromatography (GPC), and is a value measured by a similar method as that of the maleimide based copolymer (A). The weight average molecular weight can be adjusted by the kind and amount of the chain transfer agent, solvent concentration, polymerization temperature, and the kind and amount of the polymerization initiator.

As the resin (C), for example, a method using two kinds of resins, powder ABS resin obtained by emulsion polymerization and pellet SAN resin obtained by continuous bulk polymerization can be mentioned. In addition, a method in which powder ABS resin obtained by emulsion polymerization and pellet SAN resin obtained by continuous bulk polymerization are once subjected to melt blending using an extruder and the like to obtain pellet ABS resin, and then such pellet ABS resin is used can be mentioned. Further, a method in which pellet ABS resin obtained by continuous bulk polymerization and powder ABS resin obtained by emulsion polymerization are used can be mentioned. In addition, a method in which pellet ABS resin obtained by continuous bulk polymerization and powder ABS resin obtained by emulsion polymerization are once subjected to melt blending using an extruder and the like to obtain pellet ABS resin, and then such pellet ABS resin is used can be mentioned. Further, a method in which pellet ABS resin obtained by continuous bulk polymerization is used can be mentioned.

Resin (C) contained in 100 mass % of the thermoplastic resin composition is preferably 5 to 70 mass %, more preferably 20 to 60 mass %. When the content of the resin (C) is less than 5 mass %, the chemical resistance of the thermoplastic resin composition can degrade, and when the content exceeds 70 mass %, the heat resistance of the thermoplastic resin composition can degrade.

<Thermoplastic Resin Composition>

The thermoplastic resin composition is obtained by melt blending the afore-mentioned maleimide based copolymer (A), polycarbonate (B), and resin (C). Melt blending can be carried out by known methods, for example, a method in which maleimide based copolymer (A), polycarbonate (B), and resin (C) are subjected to melt blending using twin screw extruder. The twin screw extruder can be rotated in the same direction or can be rotated in a different direction. As the other instrument for carrying out melt blending, single screw extruder, multi screw extruder, continuous kneading machine with twin screw rotors, co-kneader, and Banbury mixer can be mentioned. When the twin screw extruder is used, the temperature of the cylinder can be set in the range of 200 to 320° C., preferably 210 to 290° C.

The thermoplastic resin composition can be formulated with other resin component, impact resistance modifier, flowability modifier, hardness modifier, antioxidant, inorganic filler, matting agent, flame retardant, flame retardant auxiliary, anti-drip agent, sliding agent, heat dissipating material, electromagnetic wave absorber, plasticizer, lubricant, mold release agent, UV absorber, light stabilizer, antibacterial agent, anti-fungal agent, antistatic agent, carbon black, titanium oxide, pigments, dyes and the like, in addition to the maleimide based copolymer (A), polycarbonate (B), and resin (C) to an extent that it does not impair the effect of the present invention.

The thermoplastic resin composition thus obtained can be molded with known methods. For example, injection molding, sheet extrusion molding, vacuum molding, blow molding, foam molding, hetero-extrusion molding and the like can be mentioned. When molding, the thermoplastic resin composition is usually processed after being heated to 200 to 280° C., preferably 210 to 270° C. Molded articles can be used for automobiles, household appliances, office equipment parts and the like.

EXAMPLES

Hereinafter, detailed explanation is provided with reference to Examples. However, the present invention is not limited to the following Examples.

Production Example of Maleimide Based Copolymer (A-1)

To an autoclave having a capacity of about 120 liters equipped with an agitator, 40 parts by mass of styrene, 10 parts by mass of acrylonitrile, 3 parts by mass of maleic anhydride, 0.1 parts by mass of 2,4-diphenyl-4-methyl-1-pentene, and 9 parts by mass of methyl ethyl ketone were charged. After replacing the gaseous phase of the system with nitrogen gas, the temperature was raised to 92° C. over minutes with agitation. After raising the temperature, the temperature was kept at 92° C., and a solution prepared by dissolving 23 parts by mass of maleic anhydride and 0.22 parts by mass of t-butylperoxy-2-ethylhexanoate in 69 parts by mass of methyl ethyl ketone and 19 parts by mass of styrene were added continuously over hours. Further, after completion of the addition of maleic anhydride, 5 parts by mass of styrene was added continuously over 2 hours. After adding styrene, the temperature of the reaction mixture was raised to 120° C., and the reaction was carried out for 1 hour to complete polymerization. Thereafter, 23 parts by mass of aniline and 0.5 parts by mass of triethylamine were added to the polymerization solution, and reaction was carried out at 140° C. for 7 hours. The imidizing reaction solution after completion of reaction was fed to a vent type screw extruder, and the volatile component was removed to obtain pellet maleimide based copolymer A-1. Results of analysis for the maleimide based copolymer A-1 are shown in Table 1.

Production Example of Maleimide Based Copolymer (A-2)

To an autoclave having a capacity of about 120 liters equipped with an agitator, 22 parts by mass of styrene, 13 parts by mass of acrylonitrile, 4 parts by mass of maleic anhydride, 0.1 parts by mass of 2,4-diphenyl-4-methyl-1-pentene, and 12 parts by mass of methyl ethyl ketone were charged. After replacing the gaseous phase of the system with nitrogen gas, the temperature was raised to 92° C. over minutes with agitation. After raising the temperature, the temperature was kept at 92° C., and a solution prepared by dissolving 25 parts by mass of maleic anhydride and 0.22 parts by mass of t-butylperoxy-2-ethylhexanoate in 75 parts by mass of methyl ethyl ketone and 28 parts by mass of styrene were added continuously over hours. Further, after completion of the addition of maleic anhydride, 8 parts by mass of styrene was added continuously over 2 hours. After adding styrene, the temperature of the reaction mixture was raised to 120° C., and the reaction was carried out for 1 hour to complete polymerization. Thereafter, 26 parts by mass of aniline and 0.5 parts by mass of triethylamine were added to the polymerization solution, and reaction was carried out at 140° C. for 7 hours. The imidizing reaction solution after completion of reaction was fed to a vent type screw extruder, and the volatile component was removed to obtain pellet maleimide based copolymer A-2. Results of analysis for the maleimide based copolymer A-2 are shown in Table 1.

Production Example of Maleimide Based Copolymer (A-3)

To an autoclave having a capacity of about 120 liters equipped with an agitator, 17 parts by mass of styrene, 22 parts by mass of acrylonitrile, 5 parts by mass of maleic anhydride, 0.1 parts by mass of 2,4-diphenyl-4-methyl-1-pentene, and 20 parts by mass of methyl ethyl ketone were charged. After replacing the gaseous phase of the system with nitrogen gas, the temperature was raised to 92° C. over minutes with agitation. After raising the temperature, the temperature was kept at 92° C., and a solution prepared by dissolving 20 parts by mass of maleic anhydride and 0.25 parts by mass of t-butylperoxy-2-ethylhexanoate in 80 parts by mass of methyl ethyl ketone and 28 parts by mass of styrene were added continuously over hours. Further, after completion of the addition of maleic anhydride, 8 parts by mass of styrene was added continuously over 2 hours. After adding styrene, the temperature of the reaction mixture was raised to 120° C., and the reaction was carried out for 1 hour to complete polymerization. Thereafter, 22 parts by mass of aniline and 0.4 parts by mass of triethylamine were added to the polymerization solution, and reaction was carried out at 140° C. for 7 hours. The imidizing reaction solution after completion of reaction was fed to a vent type screw extruder, and the volatile component was removed to obtain pellet maleimide based copolymer A-3. Results of analysis for the maleimide based copolymer A-3 are shown in Table 1.

Production Example of Maleimide Based Copolymer (A-4)

To an autoclave having a capacity of about 120 liters equipped with an agitator, 40 parts by mass of styrene, 10 parts by mass of acrylonitrile, 3 parts by mass of maleic anhydride, 0.1 parts by mass of 2,4-diphenyl-4-methyl-1-pentene, and 9 parts by mass of methyl ethyl ketone were charged. After replacing the gaseous phase of the system with nitrogen gas, the temperature was raised to 92° C. over minutes with agitation. After raising the temperature, the temperature was kept at 92° C., and a solution prepared by dissolving 23 parts by mass of maleic anhydride and 0.22 parts by mass of t-butylperoxy-2-ethylhexanoate in 69 parts by mass of methyl ethyl ketone and 19 parts by mass of styrene were added continuously over hours. Further, after completion of the addition of maleic anhydride, 5 parts by mass of styrene was added continuously over 2 hours. After adding styrene, the temperature of the reaction mixture was raised to 120° C., and the reaction was carried out for 1 hour to complete polymerization. Thereafter, 12 parts by mass of aniline and 0.2 parts by mass of triethylamine were added to the polymerization solution, and reaction was carried out at 140° C. for 7 hours. The imidizing reaction solution after completion of reaction was fed to a vent type screw extruder, and the volatile component was removed to obtain pellet maleimide based copolymer A-4. Results of analysis for the maleimide based copolymer A-4 are shown in Table 1.

Production Example of Maleimide Based Copolymer (A-5)

To an autoclave having a capacity of about 120 liters equipped with an agitator, 25 parts by mass of styrene, 8 parts by mass of acrylonitrile, 5 parts by mass of maleic anhydride, 0.1 parts by mass of 2,4-diphenyl-4-methyl-1-pentene, and 15 parts by mass of methyl ethyl ketone were charged. After replacing the gaseous phase of the system with nitrogen gas, the temperature was raised to 92° C. over minutes with agitation. After raising the temperature, the temperature was kept at 92° C., and a solution prepared by dissolving 30 parts by mass of maleic anhydride and 0.22 parts by mass of t-butylperoxy-2-ethylhexanoate in 90 parts by mass of methyl ethyl ketone and 25 parts by mass of styrene were added continuously over hours. Further, after completion of the addition of maleic anhydride, 7 parts by mass of styrene was added continuously over 2 hours. After adding styrene, the temperature of the reaction mixture was raised to 120° C., and the reaction was carried out for 1 hour to complete polymerization. Thereafter, 31 parts by mass of aniline and 0.6 parts by mass of triethylamine were added to the polymerization solution, and reaction was carried out at 140° C. for 7 hours. The imidizing reaction solution after completion of reaction was fed to a vent type screw extruder, and the volatile component was removed to obtain pellet maleimide based copolymer A-5. Results of analysis for the maleimide based copolymer A-5 are shown in Table 1.

Production Example of Maleimide Based Copolymer (A-6)

To an autoclave having a capacity of about 120 liters equipped with an agitator, 20 parts by mass of styrene, 8 parts by mass of acrylonitrile, 4 parts by mass of maleic anhydride, 0.1 parts by mass of 2,4-diphenyl-4-methyl-1-pentene, and 16 parts by mass of methyl ethyl ketone were charged. After replacing the gaseous phase of the system with nitrogen gas, the temperature was raised to 92° C. over minutes with agitation. After raising the temperature, the temperature was kept at 92° C., and a solution prepared by dissolving 38 parts by mass of N-phenyl maleimide and 0.2 parts by mass of t-butylperoxy-2-ethylhexanoate in 152 parts by mass of methyl ethyl ketone and 23 parts by mass of styrene were added continuously over hours. Further, after completion of the addition of N-phenyl maleimide, 7 parts by mass of styrene was added continuously over 2 hours. After adding styrene, the temperature of the reaction mixture was raised to 120° C., and the reaction was carried out for 1 hour to complete polymerization. The polymerization solution after completion of reaction was fed to a vent type screw extruder, and the volatile component was removed to obtain pellet maleimide based copolymer A-6. Results of analysis for the maleimide based copolymer A-6 are shown in Table 1.

Production Example of Maleimide Based Copolymer (A-7)

To an autoclave having a capacity of about 120 liters equipped with an agitator, 65 parts by mass of styrene, 7 parts by mass of maleic anhydride, 0.2 parts by mass of 2,4-diphenyl-4-methyl-1-pentene, and 25 parts by mass of methyl ethyl ketone were charged. After replacing the gaseous phase of the system with nitrogen gas, the temperature was raised to 92° C. After raising the temperature, the temperature was kept at 92° C., and a solution prepared by dissolving 28 parts by mass of maleic anhydride and 0.18 parts by mass of t-butylperoxy-2-ethylhexanoate in 100 parts by mass of methyl ethyl ketone was added continuously over 7 hours. After addition, 0.03 parts by mass of t-butylperoxy-2-ethylhexanoate was added, and the temperature of the reaction mixture was raised to 120° C., and the reaction was carried out for 1 hour to complete polymerization. Thereafter, 32 parts by mass of aniline and 0.6 parts by mass of triethylamine were added to the polymerization solution, and reaction was carried out at 140° C. for 7 hours. The imidizing reaction solution after completion of reaction was fed to a vent type screw extruder, and the volatile component was removed to obtain pellet maleimide based copolymer A-7. Results of analysis for the maleimide based copolymer A-7 are shown in Table 1.

(Transmittance at 450 nm)

Maleimide based copolymer was dissolved in tetrahydrofuran to prepare a 4 mass % tetrahydrofuran solution. The solution was filled into a quartz square cell with an optical path length of 10 mm for measurement. Measurement was carried out using a spectrophotometer V-670ST (available from JASCO Corporation).

(Glass Transition Temperature)

In accordance with JIS K-7121, mid-point temperature of Tg (Tmg) of the maleimide based copolymer was measured with the following instrument and measurement conditions.

Name of Instrument: Robot DSC 6200 (available from Seiko Instruments Inc.)

Temperature Elevation Rate: 10° C./min

As for the polycarbonate (B), the following material was used.

Iupilon S-2000, available from Mitsubishi Engineering-Plastics Corporation

As the resin (C), graft copolymer (C-1) and styrene-acrylonitrile based copolymer (C-2) were used.

Production Example of Graft Copolymer (C-1)

Graft copolymer was prepared by emulsion graft polymerization. To a reactor equipped with an agitator, 143 parts by mass of polybutadiene latex having an average particle diameter of 0.3 μm, 1.0 parts by mass of sodium stearate, 0.2 parts by mass of sodium formaldehyde sulfoxylate, 0.01 parts by mass of tetrasodium ethylenediamine tetraacetic acid, 0.005 parts by mass of ferrous sulfate, and 150 parts by mass of pure water were charged, and the mixture was heated to a temperature of 50° C. To this mixture, 50 parts by mass of monomer mixture containing 75 mass % of styrene and 25 mass % of acrylonitrile, 1.0 parts by mass of t-dodecyl mercaptan, and 0.15 parts by mass of cumene hydroperoxide were continuously added over 6 hours. After completion of the addition, the temperature of the reaction mixture was raised to 65° C., and polymerization was completed with additional 2 hours, thereby obtaining a latex of graft copolymer. The latex obtained was subjected to solidification using hydrochloric acid as the coagulant. Subsequently, the latex was washed, dehydrated, and dried to

TABLE 1

| | Table 1 | | Production Example 1 | Production Example 2 | Production Example 3 | Production Example 4 | Production Example 5 | Production Example 6 | Production Example 7 |
|---|---|---|---|---|---|---|---|---|---|
| | maleimide based copolymer | | A-1 | A-2 | A-3 | A-4 | A-5 | A-6 | A-7 |
| constituent | aromatic vinyl monomer unit | [mass %] | 52.1 | 47.2 | 45.2 | 56.6 | 44.7 | 51.0 | 51.1 |
| unit | vinyl cyanide monomer unit | [mass %] | 8.3 | 10.2 | 17.5 | 8.9 | 5.9 | 8.0 | — |
| | nnaleinnide based monomer unit | [mass %] | 38.2 | 41.2 | 36.0 | 22.0 | 47.6 | 41.0 | 48.1 |
| | unsaturated dicarboxylic anhydride monomer unit | [mass %] | 1.4 | 1.4 | 1.3 | 12.5 | 1.7 | — | 0.8 |
| | glass transition temperature | [° C.] | 170 | 175 | 167 | 169 | 185 | 173 | 188 |
| | transmittance at 450 nm | [%] | 94 | 93 | 91 | 93 | 91 | 93 | 96 |

(Composition Analysis)

Measurement of the maleimide based copolymer was carried out using C-13NMR method under the following measurement conditions.

Name of Instrument: FT-NMR AVANCE 300 (available from Bruker Corporation)

Solvent: deuterated chloroform

Concentration: 14 mass %

Temperature: 27° C.

Cumulative Number: 8000 times obtain a powdery graft copolymer (C-1). Regarding the graft copolymer thus obtained, polybutadiene content was 50 mass % from the raw material formulation ratio during emulsion graft copolymerization. The constituent unit excluding the rubbery polymer was measured by NMR, which resulted as 75 mass % of styrene and 25 mass % of acrylonitrile. Gel component was measured by centrifugal separation method, which resulted in 72 mass %. Graft ratio was calculated from the gel component and the polybutadiene content, which resulted in 44%. Degree of toluene swelling was 8.1, and volume average particle diameter was calculated from TEM observation, which resulted in 0.3 μm.

Production Example of Styrene-Acrylonitrile Based Copolymer (C-2)

Styrene-acrylonitrile based copolymer was prepared by continuous bulk polymerization. One complete mixing tank type stirring tank was used as a reactor and polymerization was carried out with a capacity of 20 L. A raw material solution containing 60.5 mass % of styrene, 21.5 mass % of acrylonitrile, 18.0 mass % of ethylbenzene was prepared and continuously fed to the reactor at a flow rate of 6.5 L/h. Further, with respect to the raw material solution, of t-butyl peroxyisopropyl monocarbonate as a polymerization initiator and n-dodecyl mercaptan as a chain transfer agent were continuously added to the feed line of the raw material solution so that the concentration would be 160 ppm and 1500 ppm, respectively. The reaction temperature of the reactor was adjusted to 145° C. The polymer solution continuously withdrawn from the reactor was supplied to a vacuum devolatilizing tank equipped with a preheater to separate unreacted styrene, acrylonitrile, and ethylbenzene. The temperature of the preheater was adjusted so that the polymer temperature in the devolatilization tank would be 225° C., and the pressure in the devolatilizing tank was adjusted to 0.4 kPa. The polymer was withdrawn from the vacuum devolatilizing tank by a gear pump, extruded into a strand shape, cooled with cooling water, and was then cut to obtain a pellet styrene-acrylonitrile resin (C-2). Acrylonitrile unit content was measured in accordance with the Kjeldahl method, which resulted in 25 mass %. Further, weight average molecular weight was 105,000. The weight average molecular weight is a value of polystyrene equivalent measured by gel permeation chromatography (GPC), which was measured under following conditions.

Name of Instrument: SYSTEM-21 Shodex (available from Showa Denko K.K.)
Column: PL gel MIXED-B, 3 columns connected in series
Temperature: 40° C.
Detection: differential refractive index
Eluent: tetrahydrofuran
Concentration: 2 mass %
Calibration Curve: standard polystyrene (PS) (available from Polymer Laboratories Ltd) was used for preparation Examples•Comparative Examples The maleimide based copolymer (A), polycarbonate (B), and resin (C) were dry blended by the formulation shown in Table 2. Subsequently, the blend was melted and extruded using a twin screw extruder, thereby obtaining the thermoplastic resin composition of Examples and Comparative Examples. As the twin screw extruder, TEM-35B available from Toshiba Machine Co., having a screw diameter of 35 mm and L/D=32 was used. Extrusion was performed by screw rotation number of 250 rpm, cylinder temperature of 260° C., and ejection amount of 30 kg/h. The obtained strand was cut using a pelletizer to obtain pellets of about 2 mm.

TABLE 2

| Table 2 | | | | Example 1 | Example 2 | Example 3 | Example 4 | Example 5 |
|---|---|---|---|---|---|---|---|---|
| formulation ratio | (A) | maleimide based copolymer A-1 | | 10 | 5 | 20 | 9 | 6 |
| | | maleimide based copolymer A-2 | | — | — | — | — | — |
| | | maleimide based copolymer A-3 | | — | — | — | — | — |
| | | maleimide based copolymer A-4 | | — | — | — | — | — |
| | | maleimide based copolymer A-5 | | — | — | — | — | — |
| | | maleimide based copolymer A-6 | | — | — | — | — | — |
| | (B) | PC resin (S-2000) | | 50 | 50 | 50 | 40 | 60 |
| | (C) | graft copolymer C-1 | | 15 | 15 | 15 | 18 | 12 |
| | | styrene-acrylonitrile based copolymer C-2 | | 30 | 25 | 15 | 33 | 22 |
| maleimide monomer unit content | | | mass % | 3.82 | 1.91 | 7.64 | 3.44 | 2.29 |
| Charpy impact strength | | | kJ/m$^2$ | 83.4 | 74.5 | 56.1 | 60.1 | 81.2 |
| melt mass flow rate | | | g/10 min | 12.2 | 15.6 | 7.2 | 14.1 | 8.8 |
| Vicat softening point | | | ° C. | 124 | 120 | 131 | 120 | 127 |
| chemical resistance | | | — | A | A | B | B | A |
| YI | | | — | 38 | 32 | 46 | 36 | 40 |

| | | | | Example 6 | Example 7 | Example 8 | Example 8 | Example 10 |
|---|---|---|---|---|---|---|---|---|
| formulation ratio | (A) | maleimide based copolymer A-1 | | — | — | — | — | — |
| | | maleimide based copolymer A-2 | | 10 | — | — | — | — |
| | | maleimide based copolymer A-3 | | — | 10 | — | — | — |
| | | maleimide based copolymer A-4 | | — | — | 10 | — | — |
| | | maleimide based copolymer A-5 | | — | — | — | 10 | — |
| | | maleimide based copolymer A-6 | | — | — | — | — | 10 |
| | (B) | PC resin (S-2000) | | 50 | 50 | 50 | 50 | 50 |
| | (C) | graft copolymer C-1 | | 15 | 15 | 15 | 15 | 15 |
| | | styrene-acrylonitrile based copolymer C-2 | | 25 | 25 | 25 | 25 | 25 |
| maleimide monomer unit content | | | mass % | 4.12 | 3.60 | 2.20 | 4.76 | 4.10 |
| Charpy impact strength | | | kJ/m$^2$ | 86.2 | 73.3 | 86.0 | 61.2 | 57.5 |
| melt mass flow rate | | | g/10 min | 9.8 | 15.3 | 11.7 | 6.2 | 11.8 |
| Vicat softening point | | | ° C. | 125 | 122 | 124 | 127 | 125 |
| chemical resistance | | | — | A | B | B | B | B |
| YI | | | — | 41 | 45 | 38 | 43 | 40 |

TABLE 3

| Table 3 | | | Comparative Example 1 | Comparative Example 2 | Comparative Example 3 | Comparative Example 4 | Comparative Example 5 |
|---|---|---|---|---|---|---|---|
| formulation ratio | (A) | maleimide based copolymer A-1 | — | — | 5 | 30 | — |
| | | maleimide based copolymer A-7 | — | — | — | — | 10 |
| | (B) | PC resin (S-2000) | 50 | 80 | — | 50 | 50 |
| | (C) | graft copolymer C-1 | 15 | 5 | 35 | 15 | 15 |
| | | styrene-acrylonitrile based copolymer C-2 | 35 | 15 | 60 | 5 | 25 |
| maleimide monomer unit content | | mass % | — | — | 1.91 | 11.46 | 4.81 |
| Charpy impact strength | | kJ/m² | 41.6 | 72.1 | 15.4 | 36.0 | 58.1 |
| melt mass flow rate | | g/10 min | 19.5 | 4.2 | 13.5 | 3.6 | 12.3 |
| Vicat softening point | | ° C. | 114 | 142 | 110 | 139 | 128 |
| chemical resistance | | — | — | B | D | A | D | C |
| YI | | | — | 30 | 31 | 33 | 45 | 32 |

(Maleimide Monomer Unit Content)

Maleimide monomer unit content was calculated from the results of composition analysis shown in Table 1 and formulation ratio shown in Table 2 and Table 3.

(Charpy Impact Strength)

The Charpy impact strength was measured using a notched specimen in accordance with JIS K-7111. Edgewise was adopted as the striking direction, relative humidity was 50%, and atmospheric temperature was 23° C. Here, digital impact tester available from Toyo Seiki Seisaku-sho, Ltd. was used as the measuring instrument. When the Charpy impact strength was 50 kJ/m² or higher, it was evaluated as superior.

(Melt Mass Flow Rate)

Melt mass flow rate was measured at 220° C. with 98 N load in accordance with JIS K7210. When the melt mass flow rate was 5 g/10 min or more, it was evaluated as superior.

(Vicat Softening Temperature)

The Vicat softening temperature was measured in accordance with JIS K7206. Here, Method 50 (load: 50N, temperature raising speed 50° C./hour) was used, and the test piece having the size of 10 mm×10 mm and 4 mm thickness was used. HDT & VSPT testing device available from Toyo Seiki Seisaku-sho, Ltd. was used as the measuring instrument. When the Vicat softening temperature was 120° C. or higher, it was evaluated as superior.

(Chemical Resistance)

Cracks of a test piece having a shape of 316×20×2 mm were observed after 48 hours at 23° C. by a quarter ellipse method having a major radius of 250 mm and a minor radius of 150 mm. In order to eliminate influence of molding strain, the test piece was produced by pressing and cutting out a pellet at 260° C. Xylene was used as the chemical.

Critical strain was calculated by the following equation.

$$\varepsilon = b/2a^2 [1-(a^2-b^2)X^2/a^4]^{1.5} \times t \times 100$$

Critical strain: ε, major radius: a, minor radius: b, thickness of test piece: t, crack initiation point: X The chemical resistance was evaluated from the critical strain according to the following criteria. When the evaluation result was 0.6 or more, it was evaluated as acceptable.

A: 0.8 or more, B: 0.6 to 0.7, C: 0.3 to 0.5, D: 0.2 or less (YI (Color Phase))

A plate (9 cm×5 cm) was molded at a molding temperature of 240° C. using an injection molding machine (IS-50EP, available from Toshiba Machine Co., Ltd.). The yellowness YI of the molded plate was measured by a color difference meter (COLOR-7e², available from Kurashiki Spinning Co., Ltd.). When the yellowness YI was 50 or less, it was evaluated as superior.

With the thermoplastic resin composition according to Example 1 to Example 10 of the present invention, a resin composition having superior impact resistance, flowability heat resistance, chemical resistance, and color phase was obtained. On the other hand, with the thermoplastic resin composition according to Comparative Example 1 to Comparative Example 7 which do not satisfy the scope of the present invention, either one among impact resistance, flowability heat resistance, chemical resistance, and color phase was inferior.

The invention claimed is:

1. A thermoplastic resin composition, comprising:

maleimide based copolymer (A) including aromatic vinyl monomer unit, vinyl cyanide monomer unit, and maleimide monomer unit;

polycarbonate (B); and resin (C) containing ABS resin and SAN resin; wherein:

the maleimide monomer unit is contained by 0.5 to 10 mass %, the maleimide based copolymer (A) is contained by 5 mass % or more and the polycarbonate (B) is contained by 35 to 70 mass %, and the resin (C) is contained by 30 mass % or more in 100 mass % of the thermoplastic resin composition; and the maleimide based copolymer (A) contains 5 to 15 mass % of the vinyl cyanide monomer unit and further contains 0.8 to 15 mass % of an unsaturated dicarboxylic anhydride monomer.

2. The thermoplastic resin composition of claim 1, wherein:

the maleimide based copolymer (A) comprises 40 to 60 mass % of the aromatic vinyl monomer unit, 5 to 15 mass % of the vinyl cyanide monomer unit, and 20 to 50 mass % of the maleimide monomer unit.

3. The thermoplastic resin composition of claim 1, wherein:

the thermoplastic resin composition contains 5 to 25 mass % of the maleimide based copolymer (A), 35 to 70 mass % of the polycarbonate (B), and 30 to 70 mass % of the resin (C).

4. The thermoplastic resin composition of claim 1, wherein:

the maleimide based copolymer (A) has a glass transition temperature of 165 to 200° C.

5. The thermoplastic resin composition of claim 1, wherein:

the maleimide based copolymer (A) has a transmittance of 90% or higher, the transmittance measured with a 4 mass % tetrahydrofuran solution at a wavelength of 450 nm with an optical path length of 10 mm.

6. A molded article molded from the thermoplastic resin composition of claim 1.

* * * * *